Sept. 14, 1965     H. C. BRAUCHLA ETAL     3,206,028
VIBRATORY SIZING APPARATUS
Filed Jan. 16, 1963     8 Sheets-Sheet 1

FIG. 1

INVENTORS
HERBERT C. BRAUCHLA
PAUL P. RUMINSKY
BY *Semmes and Semmes*
ATTORNEYS

Sept. 14, 1965 H. C. BRAUCHLA ETAL 3,206,028
VIBRATORY SIZING APPARATUS
Filed Jan. 16, 1963 8 Sheets-Sheet 2

INVENTORS
HERBERT C. BRAUCHLA
PAUL P. RUMINSKY
BY *Semmes and Semmes*
ATTORNEYS

Sept. 14, 1965   H. C. BRAUCHLA ETAL   3,206,028
VIBRATORY SIZING APPARATUS
Filed Jan. 16, 1963   8 Sheets-Sheet 3

INVENTORS
HERBERT C. BRAUCHLA
PAUL P. RUMINSKY
BY Semmes and Semmes
ATTORNEYS

Sept. 14, 1965  H. C. BRAUCHLA ETAL  3,206,028
VIBRATORY SIZING APPARATUS
Filed Jan. 16, 1963  8 Sheets-Sheet 4

INVENTORS
HERBERT C. BRAUCHLA
PAUL P. RUMINSKY
BY Semmes and Semmes
ATTORNEYS

Sept. 14, 1965   H. C. BRAUCHLA ETAL   3,206,028
VIBRATORY SIZING APPARATUS
Filed Jan. 16, 1963   8 Sheets-Sheet 5
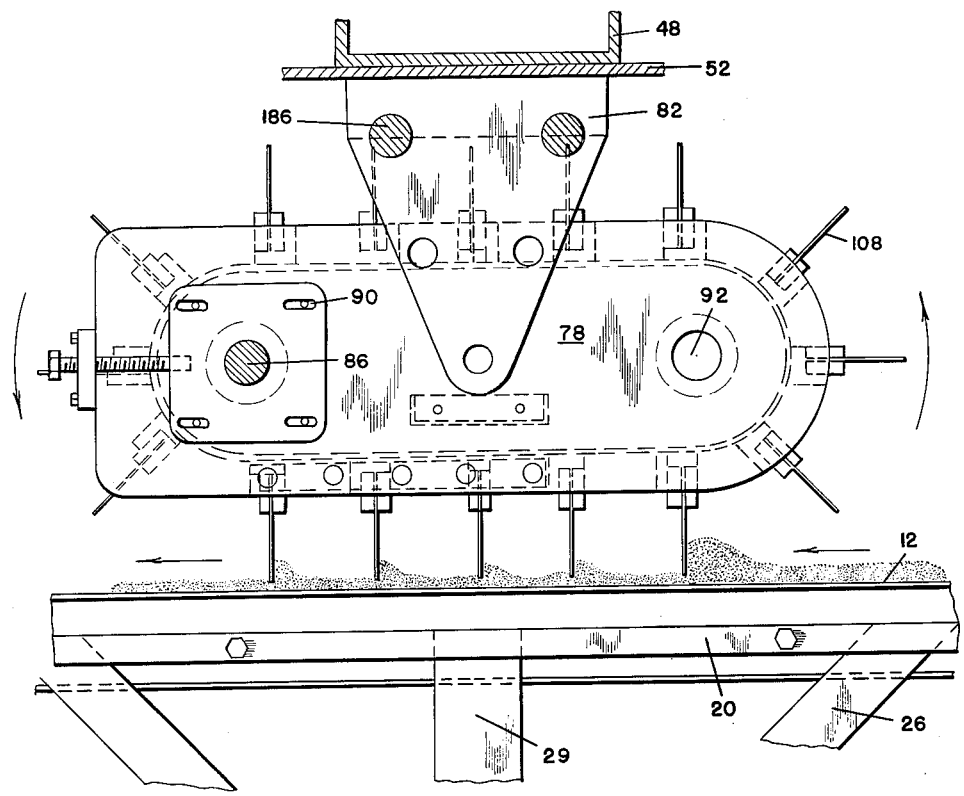
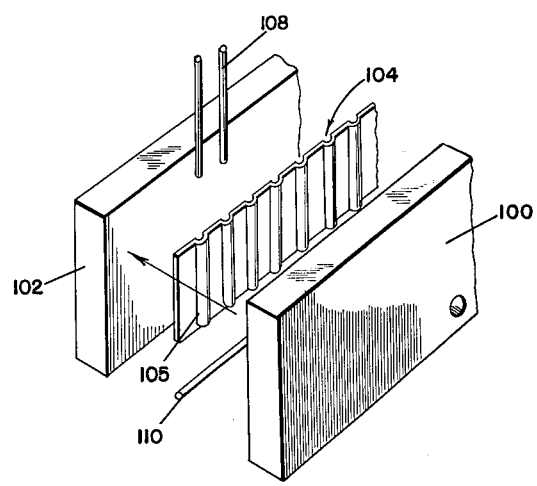
FIG.8
FIG.7
INVENTORS
HERBERT C. BRAUCHLA
PAUL P. RUMINSKY
BY *Semmes and Semmes*
ATTORNEYS Sept. 14, 1965  H. C. BRAUCHLA ET AL  3,206,028
VIBRATORY SIZING APPARATUS Filed Jan. 16, 1963  8 Sheets-Sheet 6

INVENTORS
HERBERT C. BRAUCHLA
PAUL P. RUMINSKY
BY Semmes and Semmes
ATTORNEYS

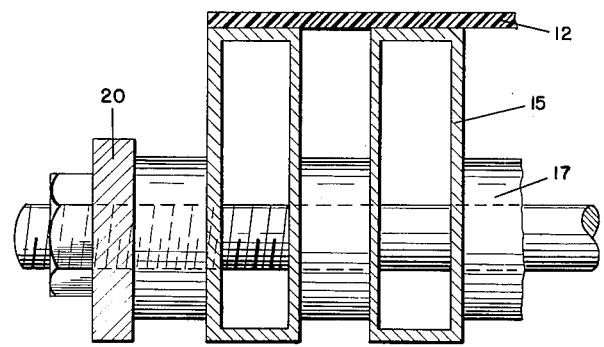
FIG. 11
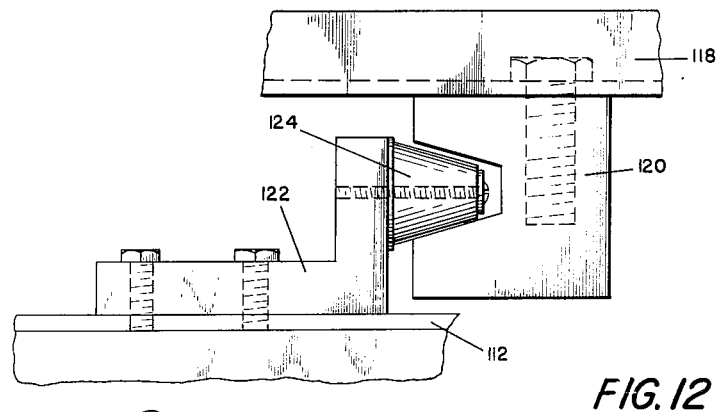
FIG. 12
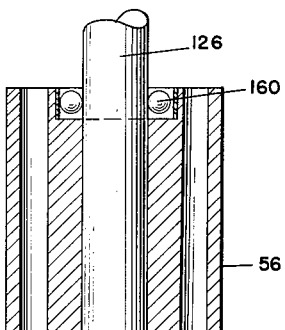
FIG. 13
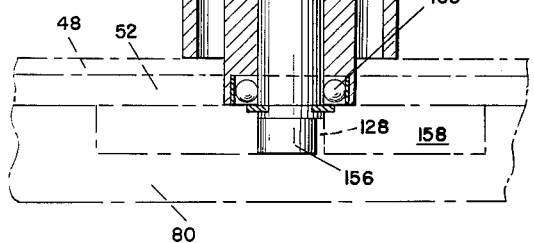

Sept. 14, 1965  H. C. BRAUCHLA ETAL  3,206,028
VIBRATORY SIZING APPARATUS

Filed Jan. 16, 1963  8 Sheets-Sheet 8

INVENTORS
HERBERT C. BRAUCHLA
PAUL P. RUMINSKY
BY Semmes and Semmes
ATTORNEYS

United States Patent Office 3,206,028
Patented Sept. 14, 1965

3,206,028
VIBRATORY SIZING APPARATUS
Herbert C. Brauchla, Fremont, and Paul P. Ruminsky, Elyria, Ohio; said Ruminsky assignor to said Brauchla, Fremont, Ohio
Filed Jan. 16, 1963, Ser. No. 251,784
3 Claims. (Cl. 209—247)

The present application is a continuation-in-part of the applicants' co-pending application Serial No. 223,626 now Patent No. 3,141,844, filed September 14, 1962, for Method and Apparatus For Dry Sizing and embodies structural improvements both in the sizing head as well as the conveyor belt bed.

The present application concerns a vibratory sizing apparatus, particularly an apparatus that is capable of sizing great quantities of mineral matter without screens and prior to concentration by air.

Concentration concerns separation of mineral or other aggregate by weight or density, the denser components usually being recovered as value and the lighter components being discarded as tails or gangue. Sizing, on the other hand, concerns the separation of matter by size alone and without respect to its density or weight. Heretofore, there have not been devised effective methods for voluminous, precise sizing of mineral matter. As a result, virtually every air method for concentration has been impractical, for mineral matter could not be effectively sized or separated into particles sufficiently small for them to be concentrated by the air concentrating medium. Herbert C. Brauchla reached this conclusion after having devised an efficient air concentration device only to find that there was not available any sizing apparatus which could supply in volume particles of mineral aggregate which could be concentrated by air.

Since biblical time sizing has been accomplished by the use of cloth or metal screens. A principal shortcoming of such screens is that inevitably they become clogged and must be cleaned by reverse flushing, vacuum treatment or the like. Also by virtue of the forcing action of the material through the screen there is distortion which contributes to inaccurate sizing. Of course, the process of forcing materials through the screens is slow, as well as exceptionally expensive.

As disclosed in the parent application applicants' apparatus provides for a vibrating head assembly of transversely aligned, radially extending combs mounted upon an endless belt which is positioned upon a conveyor belt upon which the material to be sized is advanced. Thus, the combs while rotated against the direction of flow of the material upon the conveyor attack the material to be sized. The vibratory action of the combs results in a repetitive, effective combing of the material to be sized, eliminating clogging of the combs and already provides voluminous and accurate sizing in the range 5 to 50 mesh.

Pertinent prior art references concerning such sizing have not been developed. In British Patent Number 735,720 there is shown the employment of a conveyor belt and a rotatable shaft obliquely disposed with respect to the belt, the shaft having radially projecting resilient arms sub-divided at their fringes. However, it will be seen that British 735,720 simply concerns concentration, that is separation by density again rather than separation by the size of the particle, the heavier rocks depressing the resilient belt and passing beneath the resilient arms, while the lighter roots are cast off the belt by the arms. There is no suggestion in the British reference of vibrating the rotatable shaft or resilient arms.

Accordingly, it is an object of invention to provide an improved vibratory sizing apparatus.

Additional objects of invention will become apparent from the ensuring specification and attached drawings wherein:

FIG. 1 is a perspective view of the apparatus;

FIG. 7 is an enlarged fragmentary perspective showing a modified comb assembly fitting;

FIG. 8 is an enlarged rear elevation showing the unique combing action of the individual combs, five of which are at all times in direct contact with the material being seized upon the belt;

FIG. 11 is an enlarged fragmentary vertical selection showing the unique construction of the longitudinal channel bed for the conveyor belt 12;

FIG. 12 is an enlarged section showing the stabilization rollers for the combing belt;

Figure 14:
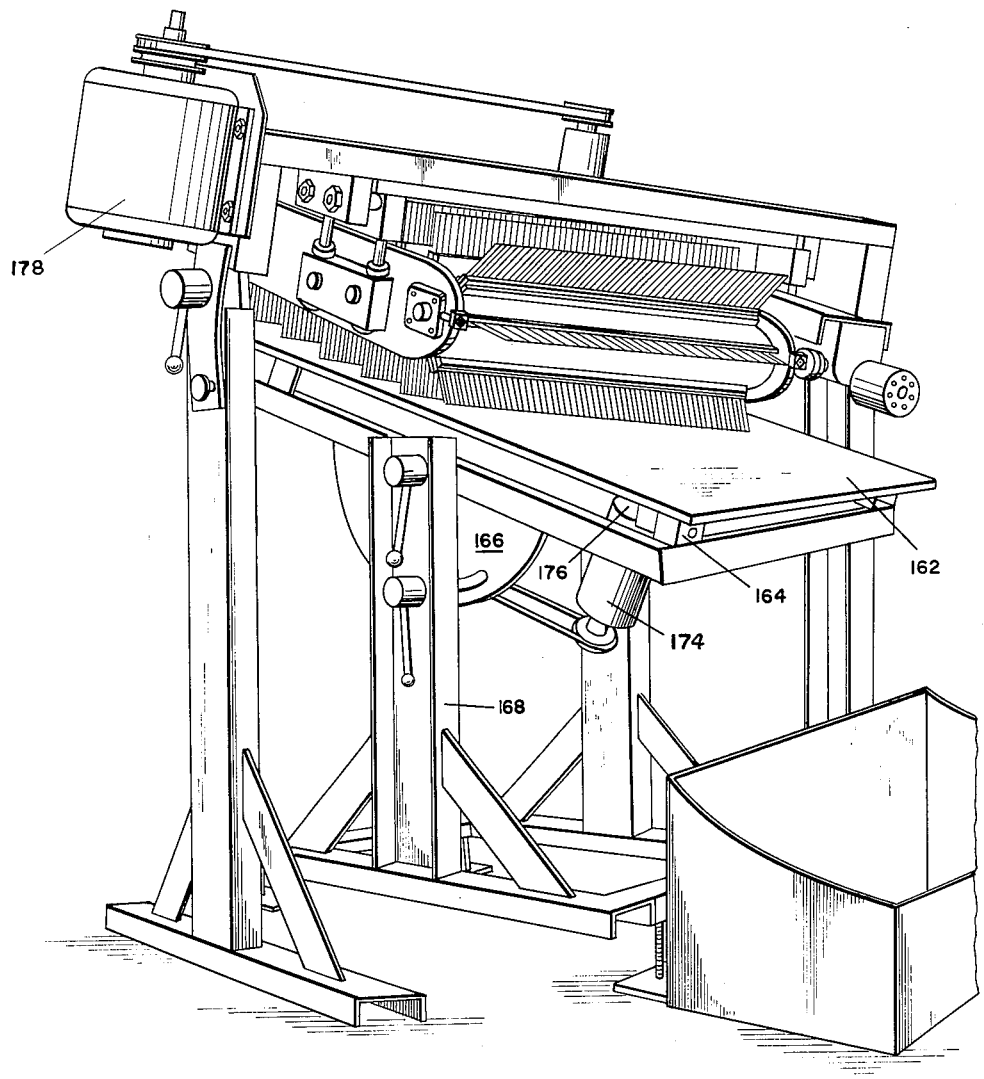

FIG. 13 is an enlarged section showing the positioning of the eccentric shaft with respect to boltster plate; and FIG. 14 is a perspective showing of a modified device wherein the conveyor consists of an independent tiltable table and the header piece itself is tiltable so as to be in horizontal alignment with the conveyor table. In this modification the forces of gravity as well as water may be utilized to enhance sizing action.

In FIG. 1, sizing bed 10 is shown as comprising an endless conveyor belt 12 rotated about driven roller 16 and idler roller 18. Belt 12 is supported between these rollers by means of a longitudinal platen 14 formed from channel irons 15 spaced by means of rings 17, as particularly illustrated in FIG. 11. Rollers 16, 18 are supported apart by means of side plates 20, roller 18 being longitudinally positionable by screw means 182 mounted in end bracket 180 for tensioning of the belt. The entire conveyor assembly 10 is supported principally by plates 24 upon beam 40 intermediate upstanding base members 28 and 29. Rigidity is provided by struts 22 and flat iron braces 26 which are secured to conveyor base intermediat beam 40. Base 27 is composed of upstanding base members 28 and 29 mounted upon horizontal channels 30 the ends of which are interconnected by means of transverse channels 32 and 34. Leveling adjustment of the entire assembly is provided by adjustment screws 36 mounted in each corner. Skirt like support elements 38 enhance the rigidity of upright members 27 and 29 with respect to bottom pieces 39. Top support pieces 42 and 44 are welded respectively to members 27 and 29 and contain upstanding dowels 46 upon which transverse top rail channel 48 is supported by means of individually welded end blocks 50.

Transversely pivotable bolster plate 52 is supported beneath top rail 48 by means of bolts 54 which extend through corresponding slots in bolster plate 52 permitting pivotability about eccentric shaft 126. Eccentric vibratory assembly 56 is mounted medially of top rail 48 and is powered by drive motor 60 having belt guard 58 containing belt 59 which is attached in driving relationship to eccentric shaft 126, and mounted upon motor plate 62. Plate 62 may be further secured by brace 64.

Matter to be sized may be introduced through an aggregate feed 66. In actual practice it has been demonstrated that the device is capable of sizing material discharged upon the belt 18 inches in width and one inch thick. As the material to be sized passes beneath comb assembly 98, sized material is recovered in bin 68 and larger material incapable of passing in between individual comb teeth or between the ends of the teeth and the belt is discharged into side discharge chute 70. Comb assembly drive motor 72 may be adjustably mounted upon bolster 52 and engage comb drive shaft 86 by means of belt 74. In actual practice it has been found that the rate of sizing is increased as the obliquity of comb 98 with respect to belt 12 is increased from 90 to 45 degrees.

Figure 10:
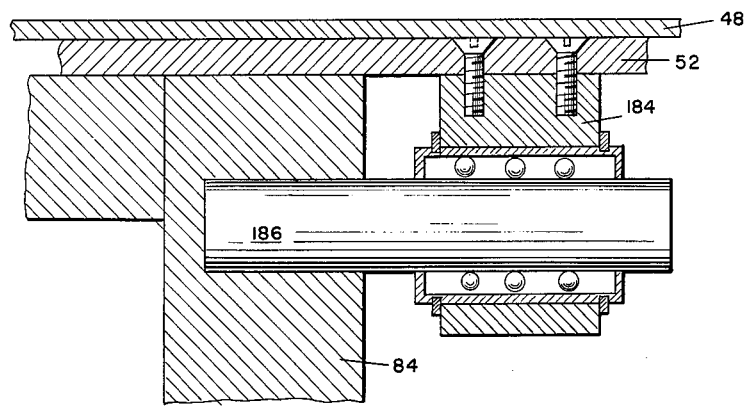
FIG 10 is an enlarged fragmentary section showing of the mounting of the comb end plates in the yoke end 84 depending from the bolster plate.

As particularly illustrated (FIGS. 2, 3, and 10) the combing assembly comprises a yoke 80 having side pieces 82 and 84 within which are mounted comb side plates 76 and 78 by means of bracket 184 with short shaft 186 mounted in linear motion bearings. Rear or drive shaft 86 extends through bearing block 88. Bearing block 88 may be secured to side plate 78 through longitudinal adjustment slots 90, providing a measure of longitudinal adjustability by adjusting pin 130 extending through plate 132 so as to tension combing belt 94.

In the illustrated embodiment link belt type chains (Ewald "Rex" link belt chain No. E1–45) are provided for rotation about 5 sprockets 96 mounted upon each of the respective drive shaft 86 and driven shaft 92.

Figure 6:
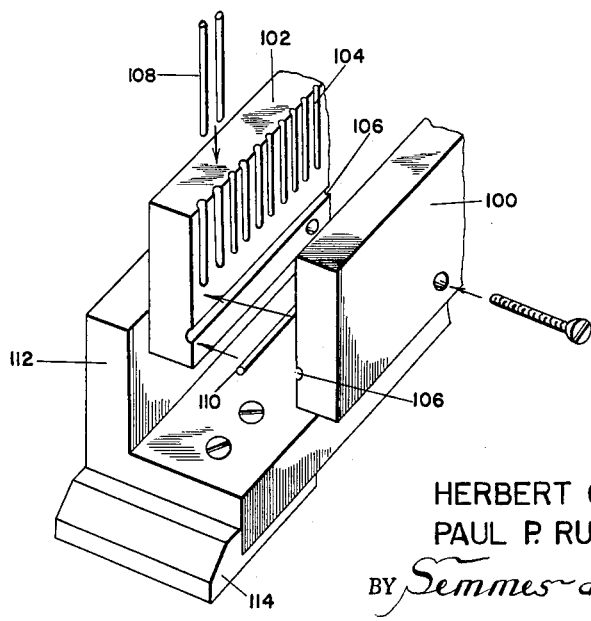
FIG. 6 is an enlarged fragmentary perspective showing the comb assembly.
Figure 9:
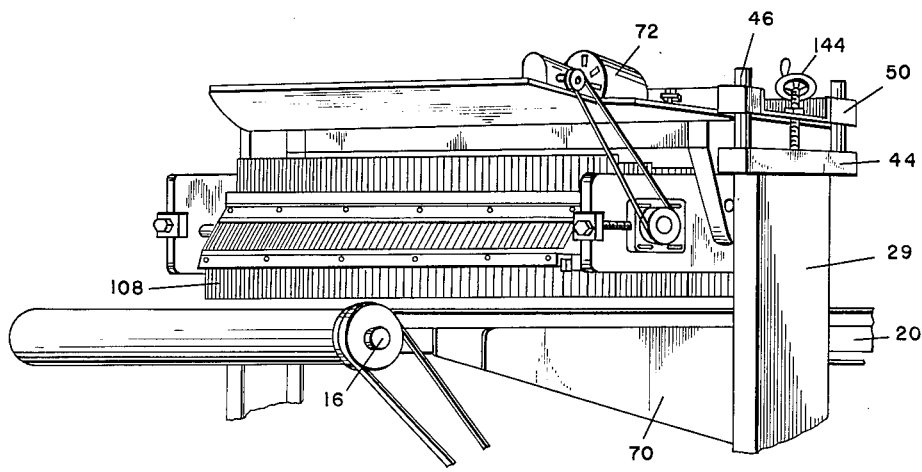
FIG. 9 is an enlarged perspective taken from one end of the apparatus and showing the unique horizontal disposition of five comb pieces parallel with respect to the conveyor belt, thus insuring a repetitive combing action.

As illustrated in FIG. 6 comb assembly 98 comprises a comb bar angle 112 onto which are inserted bars 100 and 102 by bolts. In lieu of milling slots 104 and as illustrated in FIG. 7 an aluminum sheet 104 crimped with respective slots 105 may be provided. In either case a horizontal slot 106 may be provided for insertion of positioning rod 110, insuring that the top comb ends of bars 100 and 102 are pinched so as to secure the comb elements 108. The individual comb elements may be .045 inch piano wire or any plastic or metal of sufficient durability and secured in the milled slots by means of epoxy or the like. Needless to say the more flexibility provided in the combs the shorter should be the portion of the combs extending beyond bars 100 and 102. Of course, the stiffer the combs, the more accurate the sizing. As illustrated in FIG. 9 the vibratory head may be vertically set so that comb ends 108 are spaced from belt 12. These ends may be spaced from the belt either a greater or lesser distance than the distance between the individual comb elements 108. It is the distance between the individual comb elements 108 which determines the degree of sizing, matter of greater dimension than the distance between comb elements being pushed off the side of the belt into chute 70. In actual practice effective sizing has been accomplished with rigid teeth ends 108 directly contacting rigidly supported belt 12 which was 36″ wide and constructed of three ply B. F. Goodrich fiber belt trademarked Koroseal.

Figure 3:
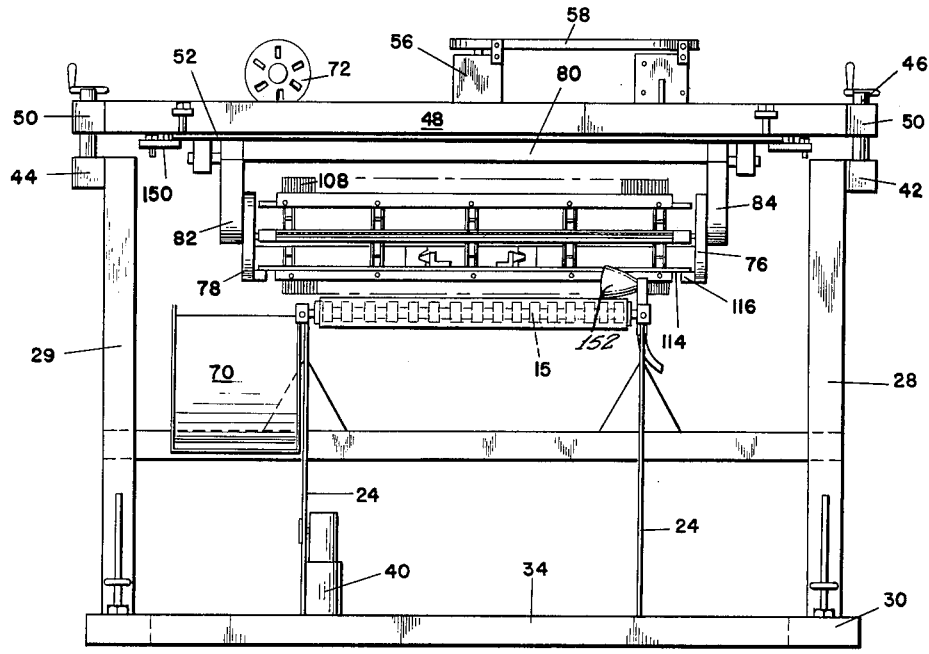
FIG. 3 is an end elevation partially in section, showing the vibratory head assembly juxtaposed with respect to the conveyor belt.

In the illustrated embodiment 18 combs were presented upon the five chains encircled about 4.5 inch sprockets, shafts 86 and 92 being eight and one-quarter inches apart. As a result and at all times 5 combs were parallel to belt 12 in the horizontal portion of travel and attacking matter to be sized. As illustrated in FIGS. 3 and 6, comb channels 112 may have side support extensions 114 which engage side bars 116 mounted inwardly of the side plates 76 and 78 so as to prevent comb bar sag. An additional safeguard illustrated in FIG. 12 may consist in guide bars 120 depending from comb inner support brace 118 so as to engage tapered bronze rollers 124 supported in roller brackets 122 attached to the individual comb bars 112.

Figure 2:
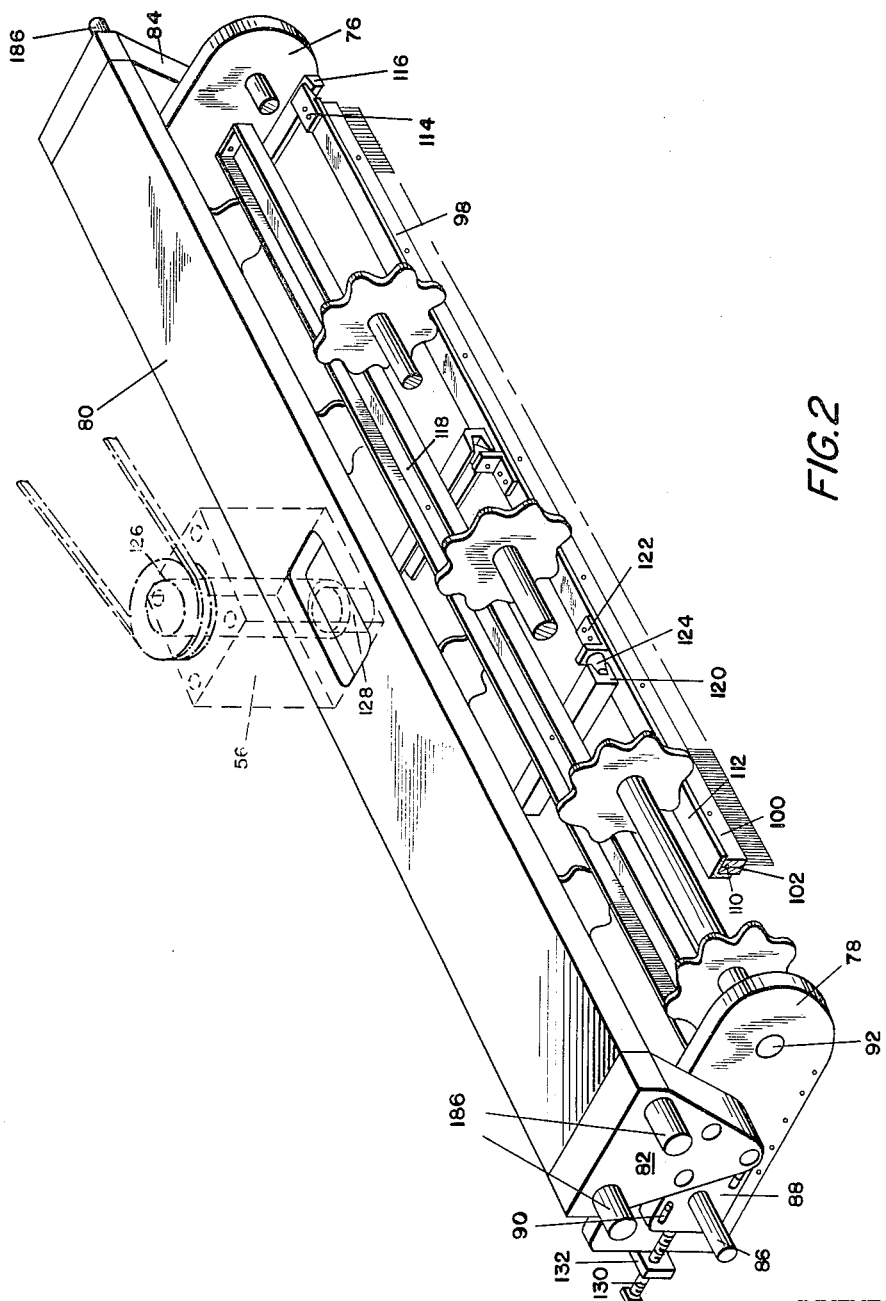
FIG. 2 is an enlarged perspective of the vibratory head, partially in section with the combing belt removed.

As illustrated in phantom in FIG. 2 and more particularly illustrated in FIG. 13, eccentric shaft 126 is mounted in a suitable bearing assembly 56 supported upon the top rail 48. Shaft 126 is supported in bearings 160 and its tip 156 extends into eccentric piece 158 of yoke top 80 the extent of eccentricity depending upon the size of aperture 128. Bolster plate 52 may be constructed of ½ inch stainless and be steadied with respect to rail 48 by means of bolster adjusting pieces 134 extending through plates 136 attached to rail 48. Conveyor belt drive motor 140 may be attached to plate 138 which is welded to the top of base channel 34, motor driving conveyor belt shaft 16 by means of belt 142.

Figure 4:
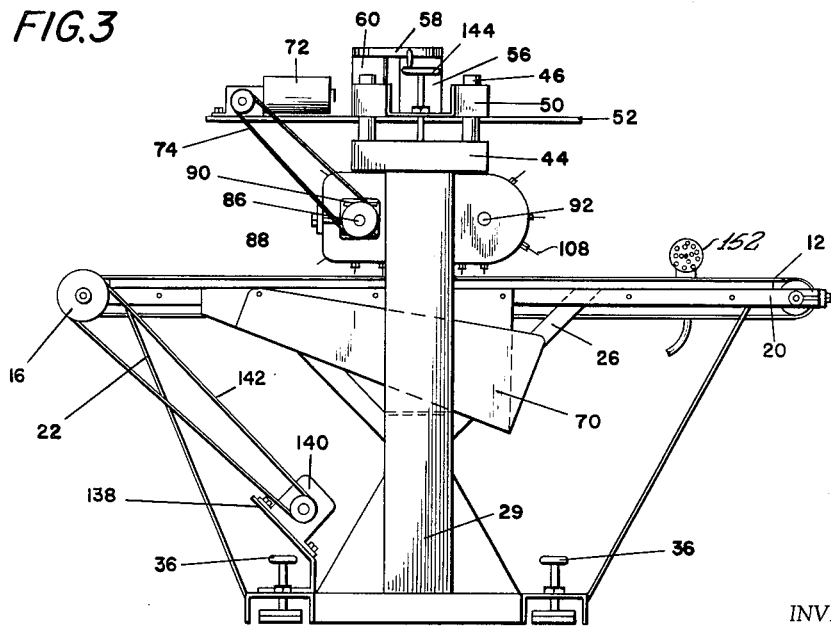
FIG. 4 is a fragmentary rear elevation, showing the side discharge chute and the motors powering the combing belt and conveyor belts.
Figure 5:
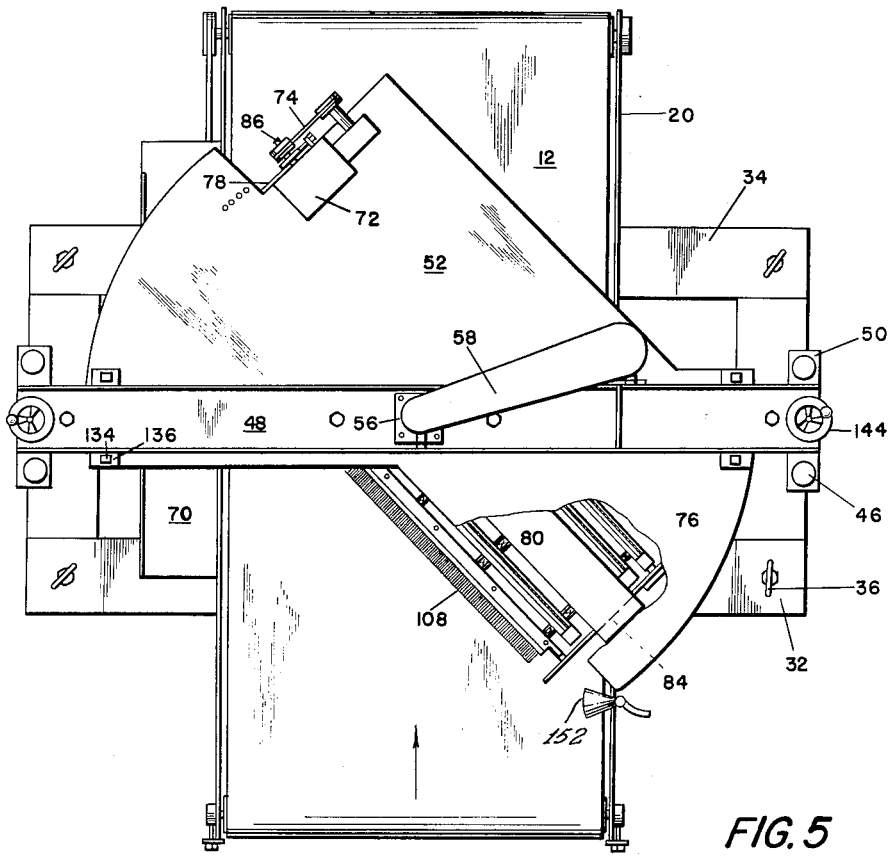
FIG. 5 is a top plan showing the operation of the transversely pivotable bolster plate from which the comb assembly depends.

As illustrated in FIG. 1 vertical adjustment of rail 48 with respect to the individual upstanding members 27 and 29 is provided by means of wheel 144 attached to threaded bolt 148 extending into the respective pieces 42 via nut members 42 secured to the base of channel 48. Guide plates 150 may be supported beneath channel 48 as to engage the peripheral edges of bolster plate 52 and prevent sagging. As illustrated in FIGURES 1, 4 and 5 a shower head 152 may be supported above belt 12 by means of side plates 20 so as to extend across above conveyor belt 12, water being introduced to lubricate the matter to be sized.

In FIG. 14 there is illustrated the modification wherein the conveyor assembly consists of a table 162 mounted via lineal bearing means 164 in cradle 166 in turn supported upon a stand 168. Inclinability of cradle 166 and table 162 is provided by means of side bolster adjustment plate 170 and manual adjusting cranks 172. Table 162 may be transversely reciprocated or vibrated by means of motor 174 supported in cradle 166 and contacting eccentric 176 secured beneath the table and operating in the manner of vibratory head piece eccentric 56. Also the vibratory head assembly may be connected to a tiltable header piece 178. This apparatus insures that the additional sizing controls consist in the degree inclination of the table and the degree of reciprocation of the table itself.

As will be apparent, principal controls may consist in the rate of rotation of conveyor belt 12 and thus the rate of introduction of matter to be sized, the rate of rotation of the comb assembly, the rate of vibration of the comb assembly, the obliquity of support of the comb assembly with respect to the advancing belt, the degree of spacing between comb elements 108 and the spacing between the ends 108 and belt 12. The comb assembly has been rotated in the range 75 to 115 feet per minute, while the conveyor belt can be rotated at a speed of 170 feet per minute. The eccentric has been operated at 2,500 r.p.m., providing vibrations in the amplitude .030 inch. However, these achievements are not to be considered as a limit of the capabilities of the apparatus.

As is well known, silica sand as found in lake beds is widely used as an aggregate in the manufacture of cement. However, the wear of ages having rounded the individual particles, it has been found that number 6 slag having rough edges is preferred for use in black top construction. In a recent article in The Wall Street Journal there was a review of the concrete industry, it having been discovered that extremely enhanced strength in concrete construction can be provided if the fine aggregates can be accurately sized. In current practice slag is sized by screens to number 6 mesh, and sold at $2.50 per ton, number 7 and the smaller meshes are essentially discarded and sold for 75¢ per ton. In the present apparatus number 5 mesh slag has easily been sized at the rate of 30 to 40 tons per hour. This was accomplished by introducing slag to be sized in an 18 inch band upon the belt at approximately 1 inch thick, advancing the conveyor belt while at a speed of 100 to 125 feet per minute. There are, of course, unlimited applications of the present device for sizing of matter. Therefore, the present invention is not to be con-

What is claimed is:
1. A vibratory sizing apparatus comprising:
 (A) an endless conveyor;
 (B) means feeding matter to be sized upon said conveyor;
 (C) a vibratory sizing head supported above and fully across said conveyor and including:
  (i) at least two upstanding members mounted at either side of said conveyor;
  (ii) a top rail connecting said two upstanding members, said top rail being provided with means for vertically adjusting the height of same;
  (iii) a bolster plate attached to and located below said top rail, said bolster plate being provided with means permitting same to pivot transversely;
  (iv) a combing belt attached to and depending from said bolster plate, said combing belt being of elongated cross-section having its top and bottom portions parallel to said conveyor;
  (v) a plurality of transversely aligned radially extending combs mounted upon said combing belt, the distance between the ends of said combs and said conveyor capable of being varied with the vertical adjustment of said top rail; and
 (D) means for vibrating said sizing head transversely of said conveyor.

2. Apparatus as in claim 1, including means separately varying the speed of rotation of said conveyor and said combing belt as a sizing control.

3. Apparatus as in claim 2, said combs being individually comprised of separate bristles mounted between a pair of comb bars removably secured to an angle affixed to said combing belt.

References Cited by the Examiner
UNITED STATES PATENTS

| | | | |
|---|---|---|---|
| 771,805 | 10/04 | Bloom | 209—471 |
| 790,171 | 5/05 | Bechtel | 209—109 |
| 866,704 | 9/07 | Witt | 198—230 |
| 1,098,934 | 2/14 | Briggs | 209—272 |
| 2,104,785 | 1/38 | Akeyson | 209—308 |
| 2,491,401 | 12/49 | Tucker | 198—230 |
| 3,141,844 | 7/64 | Brauchla et al. | 209—254 |

FOREIGN PATENTS 774,461  5/57  Great Britain.

HARRY B. THORNTON, *Primary Examiner.*
HERBERT L. MARTIN, *Examiner.*